No. 840,503. PATENTED JAN. 8, 1907.
A. H. MARKS.
VEHICLE TIRE.
APPLICATION FILED MAR. 1, 1905.
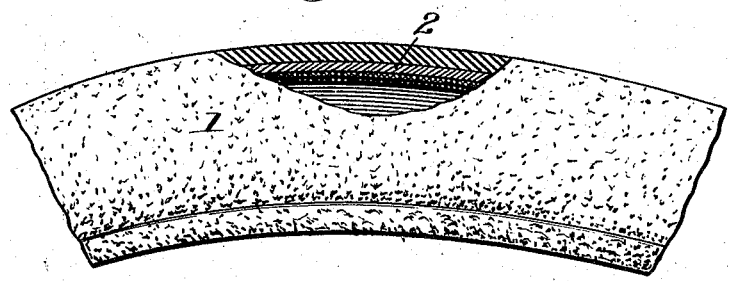
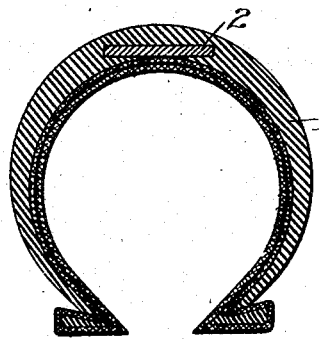
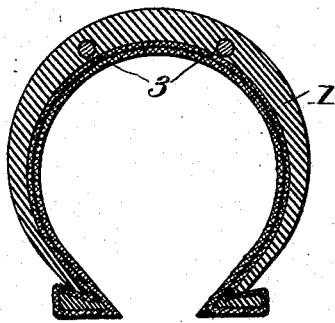
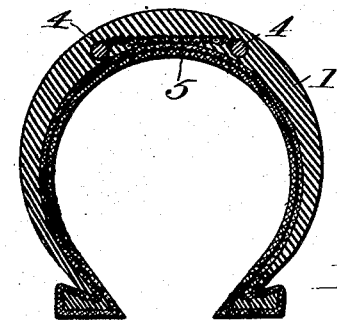
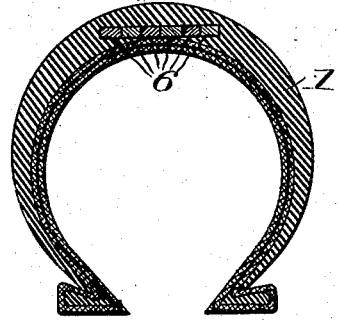
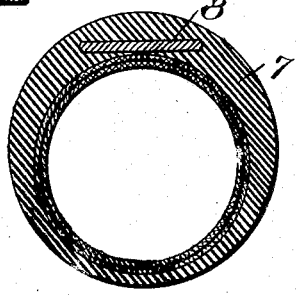
WITNESSES:
C. H. Walker
D. E. Weir
INVENTOR
Arthur H. Marks
BY
Attorneys

UNITED STATES PATENT OFFICE.

ARTHUR H. MARKS, OF AKRON, OHIO.

VEHICLE-TIRE.

No. 840,503.  Specification of Letters Patent.  Patented Jan. 8, 1907.

Application filed March 1, 1905. Serial No. 247,952.

*To all whom it may concern:*

Be it known that I, ARTHUR H. MARKS, a citizen of the United States, residing at Akron, in the county of Summit and State of Ohio, have invented certain new and useful Improvements in Vehicle-Tires, of which the following is a specification.

This invention relates to improvements in vehicle-tires; and the object is to provide a strong durable pneumatic tire or tire-casing especially adapted for heavy work, so constructed that the shock or strain produced by encountering obstructions will be distributed throughout the entire tire and felly.

With the above object in view the invention consists in the novel features of construction hereinafter fully described, particularly pointed out in the claim, and clearly illustrated by the accompanying drawings, in which—

Figure 1 is a side elevation, partly in section, of a tire-casing constructed in accordance with my invention; Fig. 2, a transverse sectional view of the same; Fig. 3, a similar view of a modified construction; Fig. 4, also a similar view of another modified form of the invention; Fig. 5, a transverse sectional view of a third modification, and Fig. 6 a transverse sectional view of a tire of the "single-tube" type embodying the form shown in Fig. 1.

Referring now more particularly to said drawings, 1 designates a tire-casing formed of rubber and reinforcing bands or layers of fabric. Between the outermost layer of fabric and the outer coating of rubber is embedded a flat comparatively heavy metal strip or ring, preferably of steel. Thus two concentric rings are provided, the rim of the wheel being one and the ring 2 the other, so that upon encountering an obstruction an eccentric movement thereof is produced. The shock or strain is thus distributed over the entire tire and vehicle-wheel.

The tire thus produced is strong and durable owing to, first, the distribution of the strain, as above set forth, and, second, to the prevention of the heating of the tread of the tire caused in the ordinary construction of tire by the continual flattening thereof at its point of contact with the ground, this heating being one of the chief causes of disintegration of the ordinary tire. A tire constructed in accordance with my invention will have a practically rigid tread and there will be little or no flattening thereof at the point of contact with the ground.

In the construction shown in Fig. 3 two metal rings 3 are embedded in the tread, one on each side thereof, instead of the single flat ring illustrated in Fig. 1.

Fig. 4 shows two metal rings 4 embedded in the tread and carrying a strip of woven wire 5, which is disposed therebetween. The woven-wire strip increases the strength of the tire by the addition of its own resisting power.

In Fig. 5 several flat metal rings 6 are embedded in the tread, said rings being placed side by side and in contact.

All of these several constructions may be applied to the single-tube tire 7 illustrated in Fig. 6, in connection with which I have shown a ring 8, similar to that disclosed in Fig. 1.

Having thus fully described my invention, what I claim as new, and desire to secure by Letters Patent of the United States, is—

A pneumatic tire or tire-casing having two metallic rings embedded therein, one at each side of the tread, and a woven-wire strip carried thereby and disposed therebetween.

In testimony whereof I affix my signature in presence of two witnesses.

ARTHUR H. MARKS.

Witnesses:
O. S. HART,
J. L. MARSHALL.